July 2, 1963  C. DE BUIGNE  3,095,973

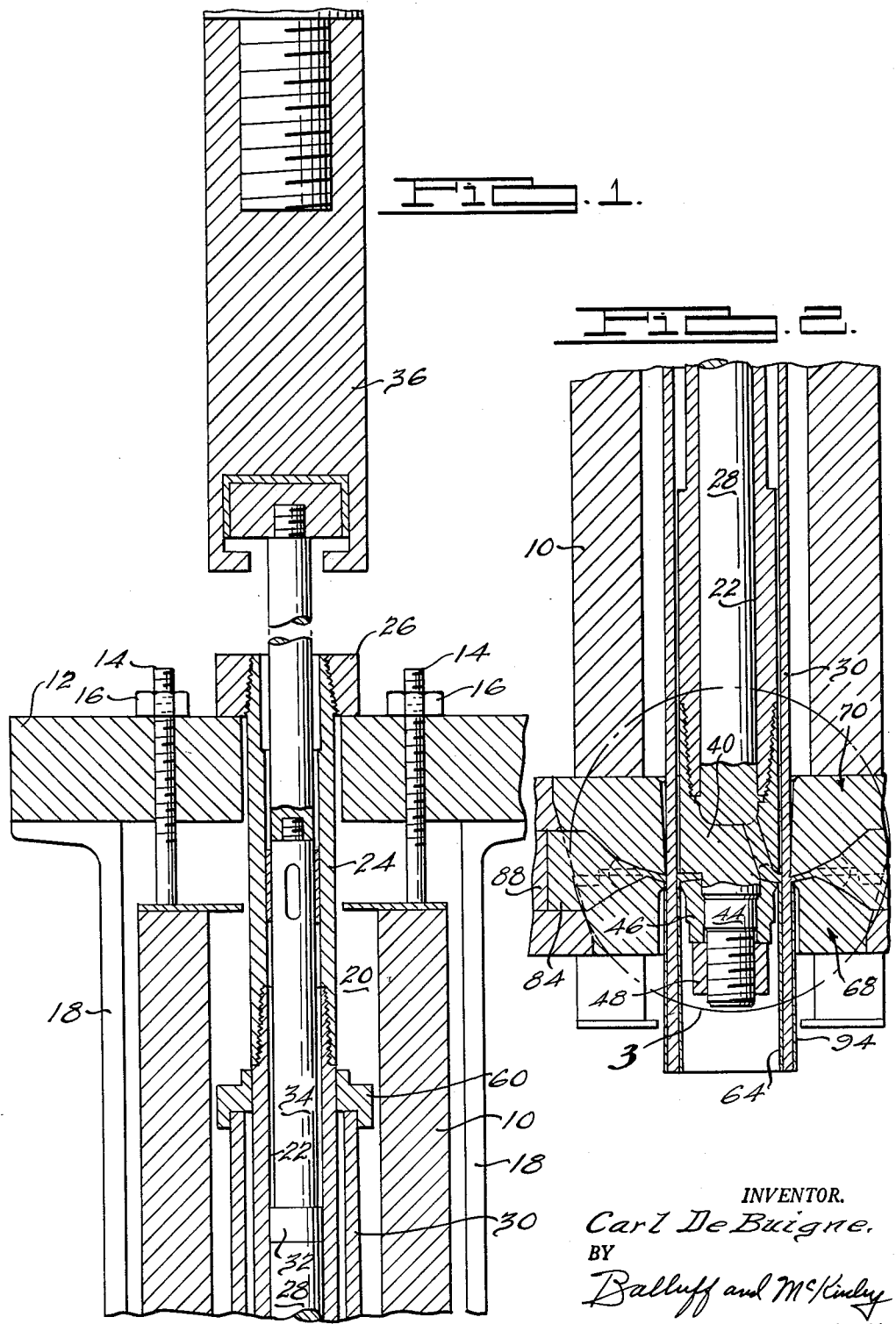

EXTRUSION CLADDING APPARATUS

Filed March 10, 1959  3 Sheets-Sheet 2

INVENTOR.
Carl DeBuigne
BY
Balluff and McKinley
ATTORNEYS.

July 2, 1963 C. DE BUIGNE 3,095,973
EXTRUSION CLADDING APPARATUS
Filed March 10, 1959 3 Sheets-Sheet 3

INVENTOR.
Carl De Buigne.
BY
Balluff & McKinley
ATTORNEYS.

3,095,973
EXTRUSION CLADDING APPARATUS
Carl De Buigne, Grosse Pointe Shores, Mich., assignor to the United States of America as represented by the United States Atomic Energy Commission
Filed Mar. 10, 1959, Ser. No. 798,420
10 Claims. (Cl. 207—4)

This invention relates to an extrusion cladding apparatus for bonding cladding metal to the inside and outside surfaces of a metal tube.

A principal object of the invention is to provide an extrusion apparatus for bonding metal, such as aluminum, as it is extruded to the inside and outside surfaces of a metal tube so as to coat the same.

Other and further objects of the invention will be apparent from the following description and claims and may be understood by reference to the accompanying drawings, of which there are three sheets, which by way of illustration show a preferred embodiment of the invention and what I now consider to be the best mode of applying the principles thereof. Other embodiments of the invention may be used without departing from the scope of the present invention as set forth in the appended claims.

In the drawings:

FIGURE 1 is a fragmentary sectional view of an extrusion apparatus embodying the invention;

FIGURE 2 is a fragmentary sectional view which is a continuation of FIGURE 1;

Figure 3:
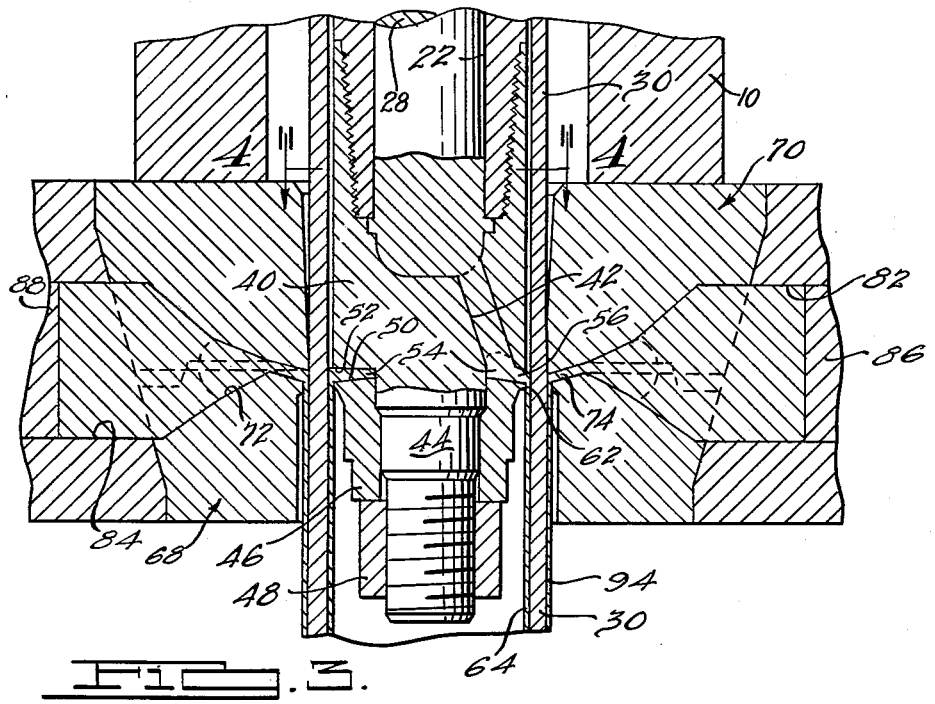
FIGURE 3 is an enlarged sectional view of the part shown in the circle 3 of FIGURE 2.
Figure 4:
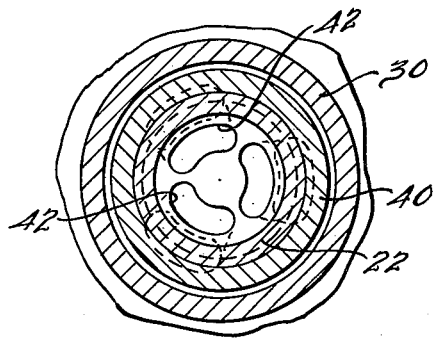
FIGURE 4 is a sectional view taken along the line 4—4 of FIGURE 3.
Figure 5:
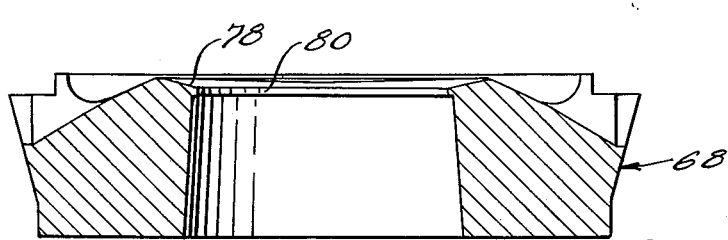
FIGURE 5 is an enlarged sectional view of one of the outer die members taken along the line 5—5 of FIGURE 6.

As shown in FIGURES 1 and 2, an extrusion cladding apparatus embodying the invention comprises an elongated vertical furnace body 10 which is suspended from a suitable transverse support 12 by means of a series of bolts 14 each having a nut 16 threaded thereon, the support 12 being mounted upon a pair of horizontally disposed beams 18 which straddle the upper end of the body 10. The furnace body 10 provides an elongated furnace chamber 20 in which a billet cylinder 22 is disposed. The upper end of the billet cylinder 22 is threaded into a tube or sleeve 24 which freely projects through an opening in the support 12 where such sleeve 24 has threadedly secured thereto a collar 26 which rests upon the support 12 whereby the cylinder 22 is supported from the support 12. The cylinder 22 forms a part of a ram-type press and is adapted to hold a billet 28 of cladding metal, such as aluminum, which is to be extruded and bonded to the inside surface of the metal tube 30 which is to be coated.

A dummy block 32 in the cylinder 22 abuts the rear end of the billet 28 and is positioned in front of a ram 34 which extends upwardly through the sleeve 24 where it is connected by a thrust coupling member 36 to a power cylinder (not shown) for applying pressure to the billet 28 so as to effect extrusion of the metal thereof from the cylinder 22.

The pressure applied to the billet 28 for extruding the same will be substantial, i.e., of the order of 50,000 to 100,000 pounds per square inch or more, depending upon the metal being extruded, the temperature at which it is maintained during extrusion, and other factors well known in the art. It is desirable to maintain the billet 28, if of aluminum, at a temperature of about 1000° to 1100° F. The apparatus may be employed for extruding ferrous or non-ferrous metals.

The discharge end of the cylinder 22 is provided by a tip or die member 40 which is threadedly secured to the threaded forward end of the cylinder 22. The member 40 is provided with a series of symmetrically arranged, axially disposed passages or ports 42 through which the metal of the billet 28 flows under the pressure imparted to the billet by the ram 34. The member 40 includes an axially extending shank 44 on which is seated an annular inside diameter die member 46, and a nut 48 threadedly secured to the threaded end of the shank 44 secures the die member 46 in position as shown.

The transversely extending annular surface 50 of the die member 46 is axially spaced from an annular end surface 52 formed on the member 40 and cooperates therewith to define an annular welding or coalescence chamber 54 and an annular radial discharge orifice 56 which is disposed so that the metal issuing from the orifice is directed radially outwardly. In the chamber 54 the metal flowing through ports 42 coalesces to form a uniform homogeneous mass which is discharged radially outwardly through the orifice 56.

The tube 30 to be coated is positioned around the cylinder 22 and at one end thereof is supported in and by an annular tube guide 60 which is slidably mounted on the cylinder 22 for movement axially thereof. The fit between the tube 30 and the socket of the tube guide 60 in which the end of the tube is located may be sufficiently tight so that the tube 30 is frictionally retained in the guide 60 or, if desired, any suitable means (not shown) may be associated with the forward end of the tube 30 for cooperation with the tube guide 60 for supporting the tube around the cylinder 22. The outer peripheral surface of the tip 40 is such as to closely fit the inside diameter of the tube 30 while permitting sliding movement therebetween.

It will be observed that the annular radial discharge orifice 56 is presented toward the inside of the tube and is shaped so as to discharge the cladding metal uniformly laterally against the inside of the tube 30 annularly thereof. An outer peripheral land 62 on the die member 46 and adjacent the orifice 56 cooperates with the tube 30 to form an annular extrusion aperture therebetween. The sides of the orifice 56 are axially spaced from each other whereby cladding metal from the billet 28 in response to the pressure applied by the ram 34 is forced into intimate contact with the inside of the tube and metallurgically bonded (i.e. welded) thereto as the tube moves axially past the orifice 56. The axial spacing of the sides of the orifice 56 is greater than the radial dimension between the land 62 and the inside of the tube 30.

The radially extending surfaces of the members 40 and 46 defining the radial discharge orifice 56 are shaped to direct the cladding metal issuing therefrom so that as such metal flows through the extrusion aperture it propels the tube 30 therewith. I contemplate, however, that means may be provided for positively moving the tube 30 past the orifice 56 at a speed in excess of that at which it is propelled by and with the metal being extruded through the extrusion aperture formed between the annular land 62 and the inside of the tube. Thus the land 62 defines the inside form and diameter of the tubular extrusion 64 which is meallurgically bonded to the tube 30.

The tube 30 may be a steel tube, the surface of which should be clean and free from corrosion, scale and the like so as not to impair the formation of a metallurgical bond between the cladding metal and the inside of the tube 30 as it moves past the orifice 56. A nickel or tin flash or other suitable coating may be pre-applied to the tube 30. Preferably the tube 30 is heated within the furnace chamber 20 to a suitable temperature so as to promote a weld between the metal of the tube and the cladding metal; and to prevent oxidation of the tube 30 while in the furnace chamber 20, the furnace may be provided with an inert atmosphere, such as helium or argon.

The extrusion apparatus also includes provisions for bonding a coating of metal to the outside surface of the tube at the same time that the coating is applied to the interior of the tube so that a bimetal tube, the interior and exterior of which are coated, may be formed in a single extrusion operation. To this end outer annular die members 68 and 70 cooperate to define an annular coalescence or welding chamber 72 having an annular discharge orifice 74 which is disposed so that the metal issuing from such orifice is directed laterally against the outer surface of the tube 30 annularly thereof.

The die member 70 is provided with a central opening 76 through which the tube 30 extends, the size of the opening being such that the tube 30 has a close fit therein while permitting sliding movement of the tube 30 past the die member 70. The radially extending surface 77 of the die member 70 which defines one side of the orifice 74 is frusto-conical in shape and forms an angle of about 15° with a plane normal to the axis of the opening 76. The surface 78 of the die member 68 which forms the opposite side of the orifice 74 is similarly disposed so that the orifice 74 will direct the cladding metal issuing therefrom against the outside of the tube 30 annularly thereof so that as the cladding metal flows through the extrusion aperture it will propel the tube 30 therewith.

The extrusion aperture for the outside coating for the tube 30 is formed by an inner annular land 80 on the die member 68 and the outside of the tube 30. As in the case of the inside coating, the cladding metal issuing from the annular orifice 74 is directed laterally against the surface of the tube 30 annularly thereof, and in response to the pressure applied to the cladding metal, it is forced into intimate contact with the outer surface of the tube and metallurgically bonded thereto as the tube moves past the orifice 74. The axial spacing of the sides of the orifice 74 is greater than the radial dimension of the extrusion aperture between the land 80 and the outside of the tube 30.

The dies 68 and 70 have associated therewith a pair of oppositely disposed billet holding cylinders 82 and 84, each adapted to hold a billet of metal to be extruded. Such metal need not necessarily be the same as that of the coating applied to the inside of the tube 30. The cylinders 82 and 84 are fragmentarily illustrated and have power actuated rams associated therewith reacting on the dummy blocks 86 and 88 for applying sufficient pressure to the metal of the billets in the cylinders 82 and 84 so as to effect the bonding of such metal to the outside of the tube 30 and the extrusion of the metal bonded to the outside of the tube through the extrusion aperture defined by the annular land 80. Suitable means (not shown) are provided for maintaining the metal in the billet cylinders 82 and 84 at a suitable extrusion temperature.

Figure 6:
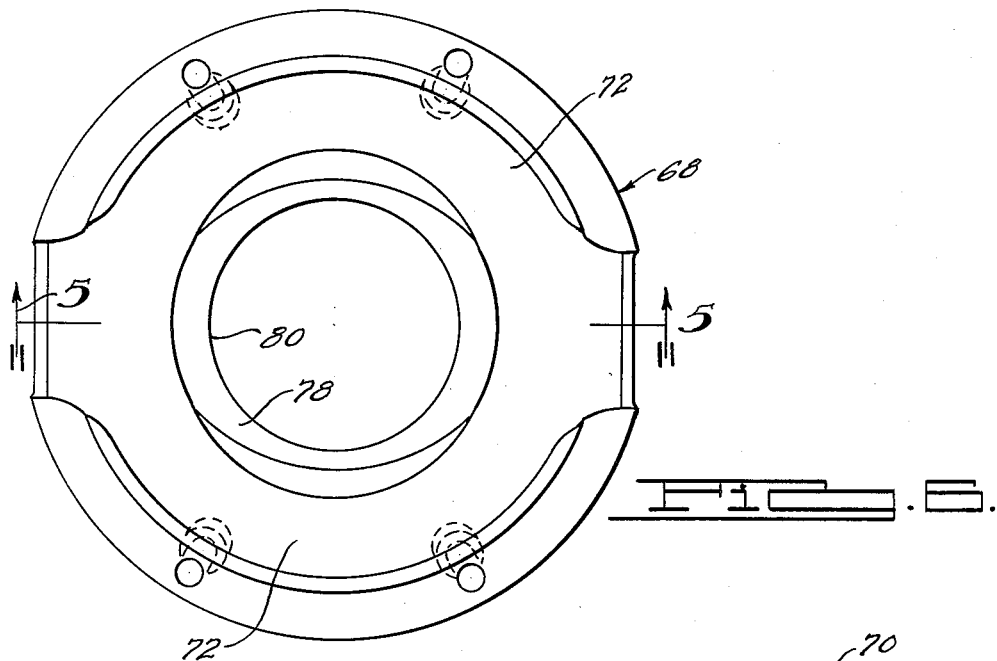
FIGURE 6 is a plan view of one face of the die member shown in FIGURE 5.
Figure 7:
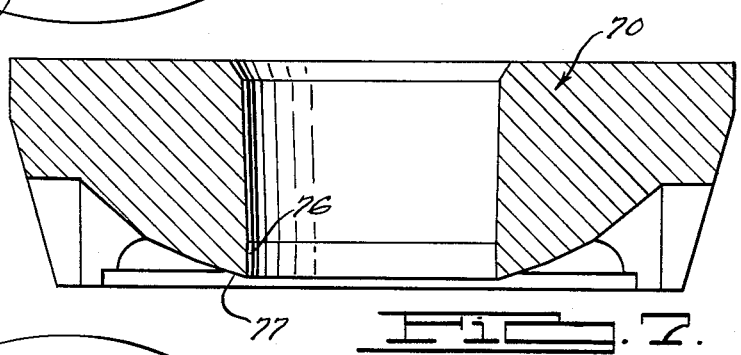
FIGURE 7 is an enlarged sectional view of another outer die member shown in FIGURE 8, taken along the line 7—7 thereof.
Figure 8:
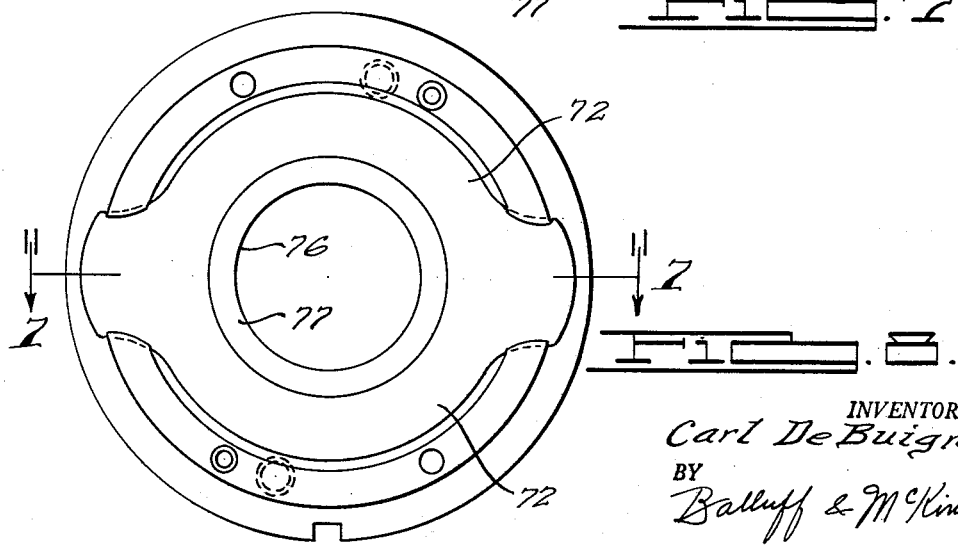
FIGURE 8 is a face view of the die member shown in FIGURE 7.

As will be observed from FIGURES 6 and 8, the die members 68 and 70 are relieved at their joining faces to form the annular coalescence or welding chamber 72 to which metal is supplied from the billet cylinders 82 and 84. In the chamber 72 the metal from the two billets in the cylinders 82 and 84 coalesces to form a uniform homogeneous mass which is then extruded with the tube through the extrusion aperture defined by the land 80, to form a uniform tubular coating 94 on the exterior of the tube 30. The thickness of the coatings may be as thin as .010 inch and may be as thick as .020 inch or more. Obviously the thickness of the tubular coatings need not be the same and will depend on the clearance between the tube and such lands. The die members 40 and 70 serve to accurately position the tube 30 relative to the lands 62 and 80 as the tube moves axially therebetween.

Because of the tremendous pressures involved, the parts of the press are made rugged so as to resist distortion at the temperatures and pressures at which the press is operated. Suitable heating means, such as electric resistance heating elements (not shown) may be employed to heat the press, the cladding metal, and the tube 30, as well understood in the art.

The discharge orifices 56 and 74 are designed so that the metal issuing therefrom will scour the surfaces of the tube 30 to promote bonding and to exert sufficient pressure between the cladding metal and the tube 30 to achieve the intimate contact required for a metallurgical bond. Thus the orifices are designed so that the extruded metal exerts a large component of force perpendicular to the surface of the tube 30. This component tends to scour the tube surfaces and thus break up any surface films, such as oxides, which might inhibit bonding.

The tube 30 acts as a moving mandrel and a tube of the cladding metal is formed in the annulus between the tube and each of the lands 62 and 80, and the thickness of each of the tubular extrusions is governed by this annulus. The clearance between the tube and each of the lands should be less than the axial width of the orifices so as to insure adequate pressure against the tube 30. The length of the lands 62 and 80 also contributes to the bonding pressure and the time of applied pressure, and, as previously noted, the orifices 56 and 74 are disposed so that there is a tangential component of force propelling the tube, but this component is relatively small.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. An extrusion cladding apparatus for bonding metal in the solid state to the inside surface of a preformed metal tube comprising a billet cylinder adapted to hold a billet of cladding metal in the solid state, guide means providing a linear path for axial movement of said preformed tube around said cylinder, an inside diameter die member fixedly secured against axial and lateral movement within the confines of such path at the discharge end of said billet cylinder which forms one side of an annular radial discharge orifice of fixed predetermined cross section for the billet metal from the cylinder within said tube as it moves through said path, the inside of said tube as it moves through said path cooperating with the outer periphery of said die member and being spaced therefrom to define an axial extrusion aperture of fixed predetermined cross section downstream relative to said orifice and in series flow relationship therewith, a power driven ram to apply extrusion pressure to the billet of metal in the solid state in said cylinder for extruding such metal in the solid state through said discharge orifice against the preformed tube and through said extrusion aperture, the sides of said orifice being axially spaced from each other whereby cladding metal in the solid state in response to the extrusion pressure applied by said ram is forced from the billet and radially discharged from said orifice toward and against the inside of said tube and into intimate contact therewith and metallurgically bonded thereto as the tube moves past said orifice, the axial spacing of the sides of said orifice being greater than the radial dimension of said extrusion aperture, said apparatus being characterized by the fact that said preformed tube moves axially thereof relative to said orifice and die member during an extrusion cladding of said tube and forms a moving mandrel for extruding cladding metal of a predetermined thickness therewith.

2. An extrusion cladding apparatus according to claim 1 wherein said radial discharge orifice is provided with an axial discharge portion shaped to direct the cladding metal so that as it is extruded through said extrusion aperture it propels the preformed tube therewith.

3. An extrusion cladding apparatus for bonding metal in the solid state to the inside surface of a preformed metal tube comprising a billet cylinder adapted to hold a billet of cladding metal in the solid state, guide means providing a linear path for movement of said tube in surrounding relation to said cylinder and for axial movement relative thereto, an inside diameter die fixedly secured against axial and lateral movement within the confines of said path at the discharge end of said billet cylinder which is provided with an annular radial orifice of fixed predetermined cross section for the discharge of billet metal from said cylinder within said tube so that the metal issuing from the orifice is directed radially outwardly toward and against the inside of said tube as it moves through said path, said tube as it moves through said path cooperating with the outer periphery of said die and being spaced therefrom to define an axial extrusion aperture of fixed predetermined cross section downstream relative to said orifice and in series flow relationship therewith, a power driven ram arranged to apply extrusion pressure to the billet of metal in the solid state in said cylinder for extruding such metal in the solid state through said discharge orifice and through said extrusion aperture, the sides of said orifice being axially spaced from each other whereby cladding metal in the solid state in response to the extrusion pressure applied by said ram is forced from the billet and radially discharged from said orifice toward and against the inside of said tube and into intimate contact therewith and metallurgically bonded thereto as the tube moves past said orifice, said radial discharge orifice being shaped to direct the cladding metal axially so that as it is extruded through said extrusion aperture it propels the tube therewith, said preformed tube forming a moving mandrel for extruding cladding metal of a predetermined thickness therewith.

4. An extrusion cladding apparatus for bonding metal in the solid state to the inside surface of a preformed metal tube comprising a billet cylinder adapted to hold a billet of cladding metal in the solid state, and having an annular radial discharge orifice of fixed predetermined cross section which is disposed so that the metal issuing from the orifice is directed radially outwardly, means providing a linear path for movement of said tube in surrounding relation to said orifice and for axial movement relative thereto, an axially fixed die within and spaced from said tube and cooperating therewith to define an axial extrusion aperture of fixed predetermined cross section downstream relative to said orifice and in series flow relationship therewith, a power driven ram arranged to apply extrusion pressure to the billet of metal in the solid state in said cylinder for extruding the metal thereof in the solid state through said discharge orifice and through said extrusion aperture, the sides of said orifice being axially spaced from each other whereby cladding metal in the solid state in response to the extrusion pressure applied by said ram is forced from the billet and radially discharged from said orifice toward and against the inside of said tube and into intimate contact therewith and metallurgically bonded thereto as the tube moves past said orifice, the axial spacing of the sides of said orifice being greater than the radial dimension of said extrusion aperture, said preformed tube forming a moving mandrel for extruding cladding metal of predetermined thickness therewith.

5. An extrusion cladding apparatus for bonding metal in the solid state to the surface of a preformed metal tube comprising a billet cylinder adapted to hold a billet of cladding metal in the solid state, means providing a linear path for axial movement of said tube in relation to said cylinder, axially fixed spaced die members defining an annular lateral discharge orifice of fixed predetermined cross section for the cylinder which is disposed so that the billet metal issuing from the orifice is directed laterally toward and against the surface of said tube annularly thereof, said tube being spaced from and projecting downstream beyond one of said die members and cooperating therewith to define an axial extrusion aperture of fixed predetermined cross section downstream relative to said orifice and in series flow relationship therewith, a power driven ram arranged to apply extrusion pressure to the billet of metal in the solid state in said cylinder for extruding the metal thereof in the solid state through said discharge orifice and through said extrusion aperture, the sides of said orifice being annular and spaced from each other whereby cladding metal in the solid state in response to the extrusion pressure applied by said ram is forced from the billet and laterally discharge from said orifice toward and against the surface of said tube and metallurgically bonded thereto as the tube moves past said orifice, the axial spacing of the annular sides of said orifice being greater than the radial dimension of said extrusion aperture, said preformed tube forming a moving mandrel for extruding cladding metal of predetermined thickness bonded thereto, said orifice being shaped so that the metal extruded therethrough reacts on the tube so as to propel said tube with the cladding metal bonded thereto through said extrusion aperture.

6. An extrusion cladding apparatus for bonding metal in the solid state to the inside and outside surfaces of a preformed metal tube comprising an inner die member the outer periphery of which forms the inner side of a first axial extrusion aperture of fixed predetermined cross section, an outer annular die member surrounding said inner die member and axially fixed with respect thereto, the inner periphery of said outer die member forming the outer side of a second axial extrusion aperture of fixed predetermined cross section, means providing a path for axial movement of said preformed tube between said die members, said metal tube being disposed around said inner die member and projecting through said outer die member and cooperating with and spaced from said die members to form the outer side of said first extrusion aperture and the inner side of said second extrusion aperture, and power extrusion means for extruding cladding metal in the solid state toward and against the inner and outer tube surfaces upstream relative to said extrusion apertures so as to metallurgically bond said metal in the solid state to the tube and for extruding such cladding metal of a predetermined thickness bonded to said tube through said extrusion apertures with said tube as it moves past said die members, said preformed tube forming a moving mandrel for said cladding metal and being so disposed relative to said power extrusion means and the extrusion pressure applied thereby that said tube moves axially during an extruding operation as the cladding metal is bonded thereto without restraint by the force applied by said power extrusion means.

7. In an extrusion cladding apparatus for bonding metal in the solid state to the inside and outside surfaces of a preformed metal tube, an axially fixed inner die member the outer periphery of which forms the inner side of a first axial extrusion aperture of fixed predetermined cross section, an outer annular die member surrounding and fixed with respect to said inner die member, the inner periphery of said outer die member forming the outer side of a second axial extrusion aperture of fixed predetermined cross section, means providing a path for axial movement of said preformed tube between said die members, said metal tube as it moves through said path being disposed around said inner die member and projecting through said outer die member and cooperating with and spaced from said die members to form the outer side of said first extrusion aperture and the inner side of said second extrusion aperture, and power extrusion means for extruding cladding metal in the solid state and directing such metal in the solid state laterally toward and against the inner and outer tube surfaces annularly thereof upstream relative to said extrusion apertures so as to metallurgically bond metal in the solid state to the tube and for extruding said metal of a predetermined thickness through said extrusion apertures with said tube as it moves past said die members, said power extrusion means directing such metal in the solid state so that as it is extruded through said extrusion apertures it propels said tube therewith, said preformed tube forming a moving mandrel for said cladding metal and being so disposed relative to said power extrusion means and the extrusion pressure applied thereby that said tube moves axially during an extruding operation as the cladding metal is bonded thereto without restraint by the force applied by said power extrusion means.

8. An extrusion cladding apparatus for bonding a metal coating in a solid state on the inside surface of a preformed metal tube comprising a billet cylinder adapted to hold a billet of cladding metal in a solid state, a tube guide surrounding said cylinder and mounted for movement axially thereof, said tube guide being adapted to freely support said preformed tube in telescoping relation with respect to said cylinder, a coalescence chamber at the discharge end of said cylinder having an annular radial discharge orifice of fixed predetermined cross section within and presented toward the inside surface of said tube, a die member the outer periphery of which forms the inside of an axial extrusion aperture of fixed predetermined cross section downstream relative to said orifice and in series flow relationship therewith, the inside of said tube being spaced from the outer periphery of said die member and forming the outside of said extrusion aperture, power means to apply extrusion pressure to a billet of metal in the solid state in said cylinder for extruding the metal thereof in the solid state through said coalescence chamber and discharge orifice and of a predetermined thickness through said extrusion aperture, the sides of said orifice being spaced from each other whereby cladding metal in the solid state from the billet in response to the extrusion pressure applied by said means is forced toward and against the inside of said tube annularly thereof and metallurgically bonded thereto as the tube moves past said orifice, said preformed tube forming a moving mandrel for said cladding metal and being so disposed relative to said power means and the extrusion pressure applied thereby that said tube moves axially during an extruding operation as the cladding metal is bonded thereto without restraint by the force applied by said power means in extruding said metal.

9. An extrusion cladding apparatus for cladding the inside surface of a preformed metal tube with metal in the solid state comprising a billet cylinder adapted to hold a billet of cladding metal in the solid state, means providing a path for free axial movement of said preformed tube around said cylinder, an inside diameter die member fixed at the discharge end of said billet cylinder and which forms one side of an annular radial orifice of fixed predetermined cross section for the discharge of metal in the solid state from the cylinder within said tube, the inside of said tube cooperating with the outer periphery of said die member and being spaced therefrom to define an axial extrusion aperture of fixed predetermined cross section downstream relative to said orifice and in series flow relationship therewith, a power driven ram to apply extrusion pressure on the billet of metal in the solid state in said cylinder for extruding such metal in the solid state through said discharge orifice and through said extrusion aperture, the sides of said orifice being axially spaced from each other whereby cladding metal in the solid state from the billet in response to the extrusion pressure applied by said ram is forced toward and against the inside of said tube as the tube moves past said orifice, said apparatus being characterized in that said path and preformed tube are so disposed that said preformed tube moves axially without restraint by said extrusion pressure relative to said orifice and die member during an extrusion cladding of said tube and forms a moving mandrel for extruding cladding metal of predetermined thickness therewith.

10. An extrusion cladding apparatus for cladding the inside and outside surfaces of a preformed metal tube with metal in the solid state comprising an inner die member the outer periphery of which forms the inner side of a first axial extrusion aperture of fixed predetermined cross section, an outer annular die member surrounding said inner die member, the inner periphery of said outer die member forming the outer side of a second axial extrusion aperture of fixed predetermined cross section, means providing a path for axial movement of said preformed tube between said die members, said metal tube as it moves through said path being disposed around said inner die member and projecting through said outer die member and cooperating with and spaced from said die members to form the outer side of said first extrusion aperture and the inner side of said second extrusion aperture, and power extrusion means for extruding cladding metal toward and against the inner and outer tube surfaces upstream relative to said extrusion apertures so as to extrude said metal in the solid state and of a predetermined thickness through said extrusion apertures with said tube as it moves past said die members, said apparatus being characterized in that said preformed tube forms a moving mandrel for said cladding metal and is so disposed relative to said power extrusion means and the extrusion pressure applied thereby that said tube moves axially during an extruding operation without restraint by the force applied by said power means in extruding said metal.

References Cited in the file of this patent
UNITED STATES PATENTS

| 74,612 | Shaw | Feb. 18, 1868 |
| 225,811 | Eaton | Mar. 23, 1880 |
| 408,374 | Cobb | Aug. 6, 1889 |
| 867,658 | Hoopes et al. | Oct. 8, 1907 |
| 1,049,641 | Astfalck | Jan. 7, 1913 |
| 2,753,995 | Tenant et al. | July 10, 1956 |

FOREIGN PATENTS

| 2,213 | Great Britain | 1861 |
| 13,741 | Sweden | July 15, 1901 |
| 796,634 | Great Britain | June 18, 1958 |